METHOD AND CIRCUIT FOR THE ASCERTAINING OF STRAIGHT LINE FORM ELEMENTS IN THE AUTOMATIC IDENTIFICATION OF CHARACTERS

Filed April 9, 1964 2 Sheets-Sheet 1

United States Patent Office 3,289,161

Patented Nov. 29, 1966

3,289,161

METHOD AND CIRCUIT FOR THE ASCERTAINING OF STRAIGHT LINE FORM ELEMENTS IN THE AUTOMATIC IDENTIFICATION OF CHARACTERS

Günther E. Gattner and Rolf Jurk, both of Munich, Germany, assignors to Siemens & Halske Aktiengesellschaft, Berlin, Germany, a corporation of Germany Filed Apr. 9, 1964, Ser. No. 358,472
Claims priority, application Germany, Apr. 11, 1963, S 84,670
20 Claims. (Cl. 340—146.3)

Our invention relates to methods and circuits for the processing of signals resulting from the scanning of legible characters, such as numerals or letters, to thereby identify the characters and issue corresponding control signals to an output device for selectively controlling it in dependence upon the characters being scanned.

Such identification of characters is applied in communication and data processing systems where the characters are read by an optical or photoelectrical scanner, and the scanner signals, upon processing by character identifying equipment, are used for controlling such output devices as a printer, typing mechanism or computer, for example.

According to known methods of this type, the automatic identification of characters in effected on the basis of so-called form or shape elements, or combinations of form elements, that are inherent in all characters of the same meaning. When scanning a character to be identified, all of the form elements contained therein and significant to the identifying operation, are ascertained and compared with memorized form-element combinations or patterns correlated to the respective characters having a given meaning. Considered as such form elements, for example, are the spreading-apart and/or merging-together of portions of a curved or sharply bent line portion, or a straight line portion. Our invention more particularly relates to identifying a straight-line portion as a form element of a character to be automatically identified, such a straight-line portion being hereinafter referred to as a "dash."

For determining the occurrence of a straight-line portion (dash) in a character being sensed by a multiplicity of parallel scans, there is a known method, described in U.S. Patent 2,877,951 and German published patent application DAS 1,095,026, which requires comparing mutually corresponding scanner signal elements of two adjacent scans with each other, and ascertaining the presence of a vertical dash (i.e. a dash in the scanning direction) from the sequential occurrence of scanner signal-element pairs "11" in a number exceeding a predetermined fixed minimum or threshold value, for example 11 or 14. It is further known from U.S. Patent 3,072,886 to ascertain the occurrence of a short, medium or long vertical line portion from the occurrence of a number of sequential scanner signal elements "1" between fixed predetermined limits within a single scan, only those individual scanner signals being counted that are either directly sequential or separated from each other only by the scanner signal element "0." Furthermore, it is known, from the published German patent application DAS 1,121,864, to utilize pulses resulting from jumps in brightness at black-white or white-black transitions, for controlling bistable flip-flop stages correlated to the respective scanning lines or to each two adjacent lines, for storing information indicative of whether last previously there occurred in one and the same scanning line a white-black transition of an odd or even order number and/or whether a white-black transition occurred in this line or in an adjacent scanning line. The stored information is then evaluated by means of coincidence gate circuits so as to recognize an ascending character-line portion and a descending character-line portion as form elements, and a vertical portion is indicated like a descending portion.

It is also known, to identify a straight-line portion by adding the scanner signal elements produced when scanning the area elements located in a row extending over the character, and to supply the sum signal to a switch which responds to the occurrence of a given threshold value so that the response is indicative of the occurrence of a straight-line portion extending in the corresponding direction.

The known methods of indicating occurrence of a straight-line character portion if a predetermined fixed threshold value is exceeded, are predicated upon the requirement that all of the characters to be identified have a definite, predetermined size and hence any straight-line portions contained in the characters have a corresponding predetermined absolute length. Only on account of such absolute length of a straight-line portion can the fact that the above-mentioned fixed indicating threshold is exceeded be taken as indicative that the particular straight-line portion constitutes a form element of the character. This imposes a considerable limitation upon the applicability of the known methods, because it makes it difficult or impossible to identify characters differing in size from the one prescribed.

Also proposed has been a system for ascertaining the occurrence of a straight-line portion if the length of this line portion attains a given fraction, for example 0.7 times the height, of the character being scanned. This system requires that the character to be identified can be read in full prior to determining its form elements, for the purpose of pre-setting the system in accordance with the height of the character and hence the length of the straight-line portion that must be reached if such porion is to be recognized as a form element. Accordingly, the character is memorized in its entire extent before the form elements contained therein are being determined. The temporarily memorized character controls a so-called length register by counting the horizontal scanning lines located between the upper and lower limits of the scanned character, this count providing a measure for the height of the character. Based upon the number of counting steps, an additional register then marks a given fraction, for example 0.7, of the number corresponding to the counting step reached. Starting from the marked counting step, the additional register is switched back one step each time a pair of scanner signal elements "11" is received, and if thus the register returns to the first counting step, the presence of a form element "dash" is indicated.

This system, therefore, is independent of the absolute length of a straight-line portion to be determined as the form element "dash" and hence is capable of ascertaining this form element in characters of different sizes. As mentioned, however, the height of the character to be identified must be determined before the system can become active in the just-mentioned manner. This necessity for pre-entering the particular threshold value to be taken as a criterion for the length of the form element "dash," involves a corresponding amount of equipment for a two-dimensional intermediate memory, register and a large amount of associated control means.

It is an object of our invention, relating to a method and system for identifying a character by ascertaining the occurrence of straight-line form elements (dashes) in parallel scans, to eliminate the necessity of predetermining the size of the character to be identified and consequently also eliminate the temporary memorizing of the entire character, as well as any multiple scanning thereof, but nevertheless to obtain definite limits for the length of a straight-line portion that is to be recognized as a form element "dash" in accordance with the particular size of the character being scanned.

In other words, it is an object of our invention to provide a system generally of the above-mentioned type, that is capable of identifying characters from signals resulting from parallel scans and permitting a large divergence in the size of the characters, while requiring only a single pass of the scanner over the character area.

According to our invention, those sequences of scanner signal elements "1" that directly follow each other along a single scan in a number at least equal to a predetermined minimum are stored, in accordance with their position along the scan, together with any previously stored sequences of such signal elements "1" as may have occurred in preceding scans; and when the rear boundary of the character being scanned is reached, these stored signal sequences are compared with the projection of the character likewise stored in accordance with the mentioned position; and the existence of a straight-line portion, constituting a form element of the character, is then detected by occurrence of coincidence of the stored sequences of scanner signal elements "1" with the projection of the scanned character as to their position within given limits.

The term scanner signal element "1" and the term projection signal element "1" are herein understood to refer to a signal element that corresponds to an area element covered by a component (signature component) of the character being read. The term scanner signal element "0" and projection signal element "0" used hereinafter denote a signal element corresponding to an area element not covered by a component of the character. The signal element "1," relating to a component of the character itself, is sometimes called "black signal," regardless of whether the character appears in black, red or any other color; and the signal element "0," relating to the background, is sometimes called "white signal," regardless of the actual background color. The signals involved, therefore, are of the on-off or binary type, and the duration of each corresponds to a length along a sweep (scan) of the scanning operation.

The term "projection" relates to the geometric or substantially orthographic projection of the character being scanned, as such projection appears from the rear, i.e. from behind the last scanning column passing over the character. This will be more fully explained hereinafter.

By virtue of the fact that according to the invention, the sequences of scanner signal elements "1" resulting from the sensing of a straight-line portion are first jointly stored and, after scanning the entire character, are compared with its projection, the limits within which a straight-line portion must be evaluated as a form element "dash" can be controlled by the scanned character itself without the necessity of viewing the entire character before commencing the identification of form elements. By presetting the above-mentioned minimum number, the identifying operation does not take into account, and hence remains unimpaired by, any line portions of a character which, on account of insufficient length, do not constitute a straight-line portion of the character proper and certainly not a form element "dash" of the character. Since no absolute minimum length must be prescribed for a straight-line portion to be recognized as a form element "dash," the invention affords identifying characters having different sizes and consequently having differently long form elements "dash" contained therein, as long as each particular character remains within the wide dimensional limits within which it still represents an identifiable meaning.

According to another feature of our invention, it is preferable to store only those sequences of scanner signal elements for comparison with the character projection, that comprise within a single scan a number of directly successive signal elements "1" that does not drop below a minimum number corresponding to the predetermined limits of the character projection and does not exceed a corresponding maximum number.

According to still another feature of our invention, several form elements "dash" contained in a character can be detected separately from each other by separately storing the respective sequences of scanner signal elements "1" occurring in respective mutually adjacent scans, the respective stored sequences being then separately compared with the character projection.

It is a particular advantage of the invention that it can be realized with circuit components of known and available types and particularly in conjunction with circuit systems already equipped with a scanner-type reading apparatus for reading and identifying alphabetic letters, numerals and symbols arranged line by line in the arrangement of a conventional text.

According to further features of our invention, the circuitry employed for detecting any occurrence of the form element "dash" in a character being scanned comprises a ring shift register whose bit-storage capacity suffices for memorizing the signal elements that may occur in a single scan (sweep column). This register receives as input those scanner signal elements "1" that occur during scanning of a character within a single scan in a directly sequential number corresponding at least to a predetermined minimum. The output of the shift register is connected to one of the two input terminals of a comparator whose other input terminal receives an end-of-character signal "1" during the interval of time in which the scanning point, when performing the first scanning sweep behind the rear boundary of a character just completely scanned, is located between the height where the projection of the scanned character commences and the height where the projection terminates. The comparator issues an output signal indicative of the form element "dash" only in the event of coincidence between the above-mentioned end-of-character signal "1" and the scanner signal element "1" applied to its first-mentioned input terminal from the ring shift register, provided such coincidence persists at least approximately for the duration of the end-of-character signal "1."

The above-mentioned and further objects, advantages and features of our invention, said features being set forth with particularity in the claims annexed hereto, will be apparent from, and will be described in, the foregoing with reference to embodiments of character identification systems according to the invention illustrated by way of example on the accompanying drawings in which:

A character identifying system according to the invention receives its input signals from an optical scanner. The characters to be viewed, such as those printed on a sheet of paper, are scanned in narrow parallel strips, and the electric pulses resulting, for example photoelectrically, from the dark and light areas, are issued as the scanner signal. Such an optical scanner is schematically shown at SC in FIG. 2 as furnishing the scanner signal through a bus line *n* and also furnishing an end-of-character signal through a line *ze*. The scanner SC is shown also connected by a synchronizing line T to a synchronizing generator SYG (master clock). Details of the scanner are not illustrated and described herein because various optical scanners suitable for the purposes of the invention are known and commercially available as separate components, and because the particular details of the scanner are not essential to the invention proper. Reference may be had, for example, to the above-mentioned U.S. Patent 2,877,951 (FIGS. 6 and 50), and said published German application DAS 1,095,026. Such scanners are available, for example, from the assignee of the present invention or from the manufacturers listed under "Optical Scanning" on pages 52 to 54 in No. 10 of Computer Equipment Comparison Series, published by McGraw-Hill Publishing Company, Inc., New York. With reference to the following description of the character identifying system, however, it will be helpful to consider the operation of an optical scanner with reference to FIG. 1 of the accompanying drawings.

Figure 1:
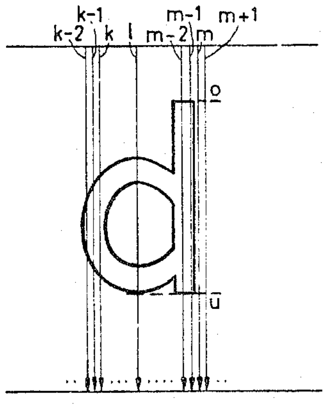
FIG. 1 is an explanatory diagram relating to the sensing of a character by scanning.

FIG. 1 exemplifies schematically the sequential point-by-point scanning of a printed character "*d*" along a sequence of vertical sweeps or scans denoted by $k-1$, $k-2$ . . . $l$ . . . $m-2$, $m-1$, $m$, $m+1$. It will be noted that the illustrated character "*d*" comprises a diversity of form elements such as a completely surrounded area, and also a vertical stretch at the right-hand side which must be evaluated as containing the form elements "dash." The scanning point first encounters the character "*d*" at its left-hand boundary, for example in the vicinity of the vertical sweep column or scan denoted by $k-2$. The next following sweep passes vertically downward along an adjacent column denoted by $k-1$, and so forth, until the entire character is scanned by a multiplicity of individual sweeps and the next following scan $m$ is already located outside of the end contour of the character. FIG. 1 will be further referred to hereinafter.

Figure 2:
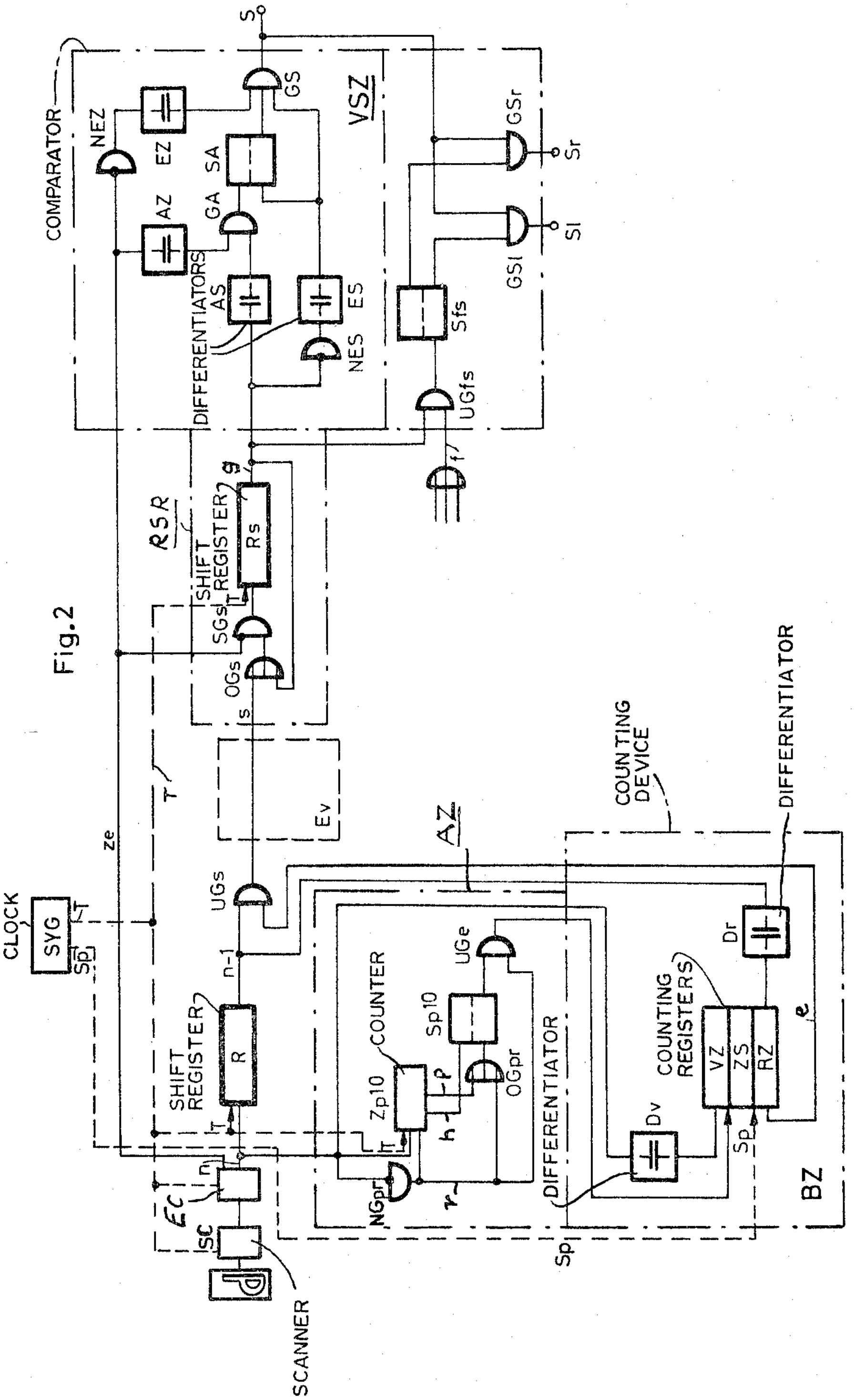
FIG. 2 is a schematic circuit diagram of a character identifying system according to the invention.

In the system shown in FIG. 2, the black and white (or "1" and "0") signals from the scanner SC pass through a shift register R and an AND gate UG*s* to a ring shift register RSR and thence to a comparator VSZ whose output terminal S furnishes an output signal indicating the identification of a form element "dash" in the character being scanned.

The ring shift register RSR comprises a shift register R*s* whose bit storage capacity suffices for memorizing the scanner signal elements that may occur in a single sweep column. The output lead of the shift register R*s* is connected through an OR gate OG*s* and a lock-out (inhibit) gate SG*s* to the input side of the register R*s*, so that the scanner signal elements "1" written into the register R*s* can be shifted on a ring path.

The input lead *s* of the ring shift register RSR, being identical with one of the input leads of the OR gate OG*s*, receives successively the scanner signal elements "1" produced during scanning of a character and occurring in direct succession during a single scan in a quantity corresponding at least to a predetermined minimum number. For this purpose, the input lead *s* of the ring shift register RSR is connected with the scanner signal line *n* through the above-mentioned shift register R and AND gate UG*s*. The shift register R operates as a delay line having a length corresponding to that of a scanning column. The AND gate UG*s* is open only when it is being supplied with the sequence of scanner signal elements "1" which directly follow each other in a number corresponding at least to the above-mentioned minimum.

Such a sequence of scanner signal elements "1" is stored in register R*s* in the order of their occurrence within the scanning column and together with any sequences of scanner signal elements "1" that may have been stored from preceding scanning columns. That is, the scanner signal "1" is written into each memory element of register R*s* if previously no scanner signal element "1" was written into the same memory element. However, a memory element into which no scanner signal element "1" is to be entered at a time but which already contains a scanner signal element "1" in storage, continues to store the latter signal element "1." In this manner, the register R*s* memorizes the longest sequence of scanner signal elements "1" occurring in a single scanning column and preserves the sequence in which these signal elements occur in the column. That is, when a scan is completed the ring shift register R*s* contains a memorized image of the longest occurring black portion of the scan under positionally correct conditions. More accurately expressed, the ring shift register R*s* memorizes with positional accuracy the projection of a portion of a just-scanned character, namely, as will be further shown, the portion of the scanned character which can be expected to contain a form element "dash."

This type of storing information concerning a character portion possibly containing a form element "dash" has the advantage of relatively small storage requirements, conjointly with a positionally correct representation of the character portion, so that subsequently the presence or absence of a form element "dash" in the particular character portion can be confirmed in a simple and reliable manner.

For the latter purpose the output lead *g* of the ring shift register R*s* is connected to one of the two inputs of the comparator VSZ, whose other input is connected to the above-mentioned lead *ze* that supplies the end-of-character signal during the interval of time in which the scanning point, when passing through a sweep just behind the rear boundary of a scanned character, travels between the heights where the beginning and the end respectively of the projection of the scanned character are located. Under the conditions exemplified by FIG. 1, the end-of-character signal "1" in line *ze* occurs and persists as the scanning point travels along the scan *m* from the horizontal broken line *o* down to the horizontal broken line *u*.

For circuitry suitable to produce such an end-of-character signal, reference may be had to the U.S. patent application Serial No. 194,287, filed May 14, 1962, assigned to the assignee of the present invention. However, as far as the present invention is concerned, it suffices to know that the line *ze* and hence the corresponding input lead of comparator VSZ carries an end signal "1" after the rear boundary of a scanned character has just been reached, and that this signal indicates, by its time position within a scanning column, the position occupied by the projection of the character just scanned.

The comparator VSZ now determines whether, for the duration of the end-of-character signal "1," there exists, at least in approximation, a state of coincidence between the individual end-of-character signal elements "1" and the scanner signal elements "1" stored in the ring shift register R*s*. In the event of such coincidence the comparators VSZ issues at its output terminal S an output signal indicative of the form element "dash."

In the specific embodiment of the comparator VSZ shown in FIG. 2, the occurrence of a straight-line portion constituting a form element "dash" is detected on the criterion that the sequences of scanner signal element "1" jointly stored in the ring shift register R*s* are positionally in full coincidence with the projection of the character scanned. For this purpose, the comparator VSZ comprises the following components.

A differentiating member AS is connected directly between the output *g* of register R*s* and one of the two inputs of an AND gate GA whose other input is connected with the end signal lead *ze* by a differentiating member AZ. Another differentiating member ES has one lead connected through a negator (inverter) NES to the output *g* of register R*s*, the second lead of the differentiating member ES being connected with the reset input of a bistable flip-flop stage SA whose set input is connected to the output of the AND gate GA. The second lead of member ES is also connected with one input of another AND gate GS which has a second input connected to the output of a bistable flip-flop SA and has a third input connected to a differentiating member EZ which in turn is connected through a negator NEZ with the end-of-character signal line *ze*.

The negators NES and NEZ have the effect that the respective differentiating members ES and EZ issue a signal pulse "1" only if the transfer from the signal condition "1" to the signal condition "0" takes place on the respective input leads, whereas by virtue of the direct connection of the differentiating members AS and AZ with the respective input leads, these latter two differentiating members will always issue a signal pulse "1" when a transfer from the signal condition "0" to the signal condition "1" takes place on the respective input leads.

The circuit illustrated in FIG. 2 operates as follows.

Assume that a character to be identified is being scanned in parallel scanning sweeps as explained above with reference to FIG. 1. In the circuit according to FIG. 2, the straight-line portions of the character, as may constitute a form element "dash," are to be detected from the scanner signal elements "0" and "1" produced in the scanning device SC and arriving on the scanner line $n$. The signal elements pass through the shift register R in which they are subjected to time delay amounting to the duration of a single scan. Consequently, a scanner signal element entered into the shift register R appears at the output $n-1$ of this register just at the moment at which the scanning has progressed to the corresponding area element of the next following scan.

Simultaneously with the supply of the scanner signal elements through line $n$ to register R, these signal elements are supplied to a device AZ which discriminates whether a character portion just being scanned is sufficiently extensive to constitute a straight-line portion of a character to be identified, or whether a signal is to be ignored as insignificant. As a result, the ring shift register R$s$ and the comparator VSZ receive only those signal elements that stem from the scanning of a character portion probably containing a form element "dash," this being then ascertained by the ring shift register R$s$ and the comparator VSZ. On the other hand, line scanner signals resulting from unsuitable character-line portions which cannot possibly contain a form element "dash," are not passed to further processing.

For the purpose of such discrimination, the scanner signal line $n$ is connected directly to the counting input of a counter Z$p$10 and is also connected through a negator NG$pr$ to the reset input of the same counter. The control (set) input of a bistable flip-flop S$p$10 is connected to the one counting output $h$ of the counter Z$p$10 that corresponds to the predetermined minimum number of directly sequential scanner signal elements "1" in a sequence of such signal elements to be stored in the ring shift register R$s$, this minimum number being preferably equal to the minimum number of projection signal elements "1" contained in the projection of a character to be identified and supplied from the scanner through line $ze$ as an end-of-character signal.

A second counting output $p$ of the counter Z$p$10 corresponds to the predetermined maximum limit for the length of the character projection and is connected through an OR gate OG$pr$ to the reset input of the bistable flip-flop S$p$10. A further connection $r$ extends from the negator NG$pr$ through the other input of the OR gate OG$pr$ to the reset input of the flip-flop S$p$10.

The counter Z$p$10 is synchronized by means of shift pulses from the synchronizing line T and is switched one count step forward each time a scanner signal element "1" enters from line $n$. The counter Z$p$10 is reset to zero by a scanner signal element "0" entering through the negator NG$pr$ which also resets the flip-flop S$p$10 through the OR gate OG$pr$.

When the number of directly sequential scanner signal elements "1" exceeds the predetermined minimum, the counter Z$p$10 arrives at the count step $h$ at which it activates the bistable flip-flop S$p$10. As long as the flip-flop remains activated, it causes the sequence of scanner signal elements to be transferred from shift register R through AND gate UG$s$ to the ring shift register R$s$, until the particular sequence of scanner signal elements is terminated. However, when this sequence of scanner signal elements "1" is too long and hence cannot possibly stem from the sensing of the straight-line portion in a character being identified, then the other counting output $p$ of the counter Z$p$10, corresponding to the predetermined maximum number of scanner signal elements "1," becomes activated and resets the flip-flop S$p$10 to the position of rest before the sequence of signal elements is terminated. That is, when the consecutive sequence of scanner signal elements "1" is either too short or too long, the flip-flop S$p$10 is held at, or prematurely returned to, the inactive condition. In both cases the sequence is not transferred from the shift register R through the AND gate UG$s$.

This performance is secured by the interposition of an AND gate UG$e$ between the above-mentioned AND gate UG$s$ in the main signal path on the one hand, and the counter S$p$10 and the negator NG$pr$ on the other hand. Only if a sequence of scanner signal elements "1" has a length within the limits corresponding to the projection length of a character to be identified, can the condition of coincidence take place at the two inputs of gate UG$e$ upon termination of that sequence, and only then is the signal sequence permitted to pass through the gate UG$s$ by having the output of gate UG$e$ provide for coincidence between the two inputs of gate UG$s$.

In the embodiment of FIG. 2, the transfer of a control signal from gate UG$e$ to gate UG$s$ is effected with the aid of an interposed counting device VZ in which the sequences that comprise directly adjoining scanner signal elements "1" in each individual scan are counted, and the respective counting steps reached each time the gate UG$e$ is activated are marked. Thereafter, when further scanner signal elements arrive from the same scan and the occurring sequences of directly adjacent scanner signal elements "1" are being counted, the counting device BZ issues a signal to gate UG$s$ each time such a marked count step is reached, so that then the particular sequence of scanner signal elements "1" is transmitted through the gate UG$s$.

In the example of the counting device BZ shown in FIG. 2, a forward counting register VZ is provided whose input is connected with the scanner signal bus line $n$ through a differentiating member D$v$ which may be omitted if the forward counting register VZ inherently comprises a differentiating input stage. The counting device BZ according to FIG. 2 further comprises an intermediate storage register ZS and a reverse counting register RZ whose control input is connected through another differentiating member D$r$ to the output $n-1$ of the shift register R.

The counting device BZ operates as follows.

As mentioned, the voltage signal on signal line $n$ is in the "1" condition as long as during columnar scanning of a character to be sensed, the scanning point passing through a scan impinges upon an area element of a line portion that forms part of the character, whereas otherwise the "0" condition obtains. At the moment when the signal line $n$ converts from "0" condition to "1" condition, the differentiating member D$v$ in counting device BZ transfers a positive counting pulse to the forward counting register VZ. The forward counting register VZ thus counts the sequences of directly adjacent scanner signal elements "1" contained in a scan.

The above-mentioned AND gate UG$e$ supplies to the counting device BZ a marked signal each time at the moment the gate UG$e$ is activated, and hence each time the device AZ has determined the occurrence of a sequence of directly successive scanner signal elements "1" whose total length is within the limits given by the projection length of a character to be identified. The marker signal has the effect of marking in the forward counting register VZ the particular count step reached at this moment. The illustrated counting device BZ does this by storing the particular count step in the intermediate register Z$s$.

After the individual scan is completed, the synchronizing signal occurring each time at the starting moment of a scan and supplied through line Sp, effects a transfer of any stored count steps from the intermediate register ZS into the reverse counting register RZ.

While all of the registers as well as the other components of the illustrated system, including the counting registers VZ, ZS, RZ are known and commercially available system components described in prior art publications, (for example, in Computer Basics, published 1962 by Howard W. Sams and Co., Inc., Indianapolis, Indiana, vol. 4, chapter 6, and vol. 6, chapter 9), including the other literature and patents mentioned elsewhere in this specification, the following will further identify the registers of the counting device BZ. The previously marked count steps are entered parallel from the forward counting register VZ into the intermediate storage register ZS and are also issued parallel from register ZS to the reverse counting register RZ. However, the register RZ, having received the count steps in parallel operation, issues them in serial operation. This serial issuance of the stored bits is obtained by virtue of the fact that the same scanner signal elements which previously shifted the forward counting register VZ in one direction, namely toward the right, thereafter effect shifting of the reverse counting register RZ in the opposite direction, to the left. This is because the input of the reverse counting register RZ is connected to the output $n-1$ of shift register R through the differentiating member Dr, in contrast to the direct (i.e. non-differential) connection between forward register VZ and shift-register output $n-1$.

Consequently the scanner signal elements which previously controlled the forward register VZ in counting device BZ, are again supplied to the same counting device BZ after a time delay corresponding to the duration of a scanning column, and the differentiating member Dr then takes care that positive shift pulses are transmitted to the reverse counting register RZ only when a change from "0" condition to "1" condition takes place in the output $n-1$ of shift register R. Each of these pulses causes any bit (marked count) that may be stored in the individual stages of the reverse counting register RZ to be shifted one step to the left.

When thus a marked count arrives at the first stage of the reverse counting register RZ, a signal "1" issues on line $e$ to the control input of the AND gate UGs. For the duration of such a control signal, the gate UGs is open and permits the passage of the sequence of directly successive scanner signal elements "1" then occurring in the output $n-1$ of shift register R and having a length within the limits determined by the projection length of the character to be identified, this sequence length having been previously recognized by the marking operation performed in the counting device BZ with the aid of the AND gate UGe connected to the counter Zp10.

For further elucidating the operations so far described, reference will again be made to FIG. 1. Assume that the column $k$ is being scanned. During this scan the forward counter VZ in counting device BZ advances a single count step corresponding to the one sequence of scanner signal elements "1" occurring in this column. This count step is not marked by action of the AND gate UGe connected to the flip-flop Sp10, because the number of scanner signal elements "1" is too small so that the counter Zp10 does not reach the step $h$ corresponding to the predetermined minimum and, therefore, the flip-flop Sp10 is not activated. Consequently, when the end of scan $k$ is reached, the forward counter VZ in counting device BZ is reset to the position of rest without previously transferring any count step into the intermediate storage register ZS.

The same applies to the scanning of the column $l$ in FIG. 1. During the latter scan, the forward counter VZ advances two steps. Both remain unmarked because the two sequences of scanner signal elements "1" are too short for activating the flip-flop Sp10. Consequently, the AND gate UGs behind the shift register R remains closed to the sequences of scanner signal elements "1" stemming from the scanning of columns $k$ and $l$.

Now assume that the scanning has progressed to column $m-2$ according to FIG. 1. As the scanning point advances from the horizontal broken line $o$ down to the broken line $u$, there occurs an unbroken sequence of signal elements "1." These are again entered into the shift register R and are simultaneously counted by counter Zp10. At the upper edge $o$ (FIG. 1) there occurs a white-black transition so that the signal bus line $n$ changes from "0" to "1" condition. As a result, the forward counter VZ in counting device BZ advances one counting step. Before the scanning point in column $m-2$ reaches the lower edge $u$ (FIG. 1) of the character, the counter Zp10 which counts the scanner signal elements "1" in the unbroken sequence reaches the step $h$ that corresponds to the predetermined minimum number, and thus activates the bistable flip-flop Sp10. Thereafter the scanning point descends in column $m-2$ down to the height of the broken line $u$ before the counter Zp10 has reached the step $p$ that corresponds to the predetermined maximum number of signal elements. Consequently the first scanner signal element "0" following upon the sequence of elements "1" has the effect of establishing coincidence in the AND gate UGe whose one input is connected through the negator NGpr to the signal bus line $n$ and whose other input is connected to the still activated flip-flop Sp10. Consequently the count step performed in forward register VZ of counting device BZ is now marked in the intermediate storage register ZS. At the start of the next scanning column $m-1$, the then occurring synchronizing signal on line Sp causes this marked counting step to be transferred from intermediate register VS to the reserve counting register RZ and to simultaneously reset the forward register VZ as well as the intermediate register ZS.

During the next following scan $m-1$ (FIG. 1) the operations described above for scan $m-2$ are repeated analogously. As the scanning point travels in colum $m-1$ from height $o$ down to height $u$, the output $n-1$ of shift register R furnishes the sequence of scanner signal elements "1" stemming from the preceding scanning column $m-2$. The first signal element "1" of this sequence, involves a change from the "0" condition to the "1" condition in the output $n-1$ of the shift register R, and therefore causes the reverse register RZ to shift one step in the reverse direction. This activates the first step of the reverse counting register RZ which passes a "1" signal through line $e$ to the AND gate UGs. The gate UGs, now open, transfers to the input $s$ of the ring shift register RSR the sequence of scanner signal elements "1" resulting from the scanning of colum $m-2$.

As a result of the above-described operations, the input line $s$ of register Rs receives stepwise only those scanner signal elements "1" that occur in a continuous sequence and in a number from a predetermined minimum up to a predetermined maximum within a single scan, for example the scan $m-2$ last considered. These scanner signal elements "1" are stored in the ring shift register Rs together with any scanner signal elements "1" as may have been previously stored therein, the storing being each time effected at a location that corresponds to the positional occurrence of the individual signal element "1" within the scanning column. During this operation, the ring shift register Rs is shifted stepwise by synchronizing pulses which are supplied through the synchronizing line T and are identical or coincident with the synchronizing signals that subdivide the sensing signal produced by the scanner into a finite number of scanner signal elements. The ring shift register Rs has a bit storing capacity just permitting the storing of the maximum number of signal elements corresponding to the length of a single scan. Therefore, those scanner signal elements "1" that occur in the respectively different scans at the same height are always written as a single signal element "1" into the same location of the ring shift register R*s*.

Now assume that the scanning operation commences with the next following scan *m* which no longer passes over the character "*d*." That is, the scanning of the character to be identified has just been completed so that the scan *m* no longer produces any signal element "1." During the scan *m* the scanner signal elements "1" stemming from the preceding scan $m-1$ and forming a continuous storable sequence are transferred through the AND gate UG*s* in analogy to the functions described above, so that this sequence of signal elements is stored in ring shift register R*s* in accordance with the position of the signal elements within scanning column $m-1$, together with the other signal elements previously stored in positionally correct locations of the same register R*s*.

Consequently, after the rear boundary of the character "*d*" shown in FIG. 1 is reached, the information memorized in the ring shift register R*s* is an image or representation of the (orthographic) projection of the character, namely the projection of the straight-line portion located at the right of the character "*d*" next to the curved *c*-shaped left-hand portion of the letter "*d*."

As mentioned, the output *g* of the ring shift register R*s* is connected to one of the two inputs of the comparator VSZ. The other input of the comparator VSZ receives an end-off character signal "1" from line *ze* during the interval of time in which the scanning point in a scanning column just behind a scanned character travels between the respective heights of the start and termination of a distance corresponding to the projection of the scanned character. The comparator VSZ then issues at its output terminal S an output signal indicative of the form element "dash," in the event there exists coincidence, at least for the approximate duration of the end-off character signal "1," between this signal and the signal element "1" arriving from the ring shift register R*s* in the first-mentioned input of the comparator. In the embodiment of FIG. 2 and under the scanning conditions exemplified by FIG. 1, the end-of-character signal "1" in line *ze* also occurs in scan $m+1$ during the interval of time in which the scanning point travels between the limits *o* and *u*.

With the above-described design of the comparator VSZ shown in FIG. 2, the coincidence condition for the AND gate GA in the comparator occurs when the first element "1" of the end-of-character signal in line *ze* and simultaneously the first element "1" of the signal elements stored in the ring shift register R*s* appears at the output *g* of register R*s*. Thus the two inputs of the AND gate GA simultaneously receive respective signal pulses through the differentiating member AZ connected to line *ze* and through the differentiating member AS connected to the output *g* of register R*s*. Obviously, such coincidence is met during scan *m* according to FIG. 1 because in this case the projection of the straight-line portion contained in the character "*d*" is identical with the projection of the entire character "*d*."

The simultaneous commencement of the projection of the straight-line portion and the projection of the entire character, detected by coincidence at the gate GA, is stored in the bistable flip-flop stage SA. At the moment when thereafter the end-of-character signal on line *ze* disappears, the differentiating member EZ passes a signal pulse to the appertaining one input of the gate GS. At its second input, the same gate GS may then already be prepared for coincidence by previous switching of the activated flip-flop SA. At the moment when the last element "1" of the sequence of signal elements "1" stored in ring shift register R*s* appears at the output *g* of register R*s*, the differentiating member ES passes a pulse to the third input of the gate GS. If the end of the line-portion projection stored in register R*s* coincides with the end of the projection of the entire character, the latter pulse at the third input of gate GS occurs simultaneously with the signal pulse transmitted by the differentiating member EZ so that, when the flip-flop SA is activated, the coincidence condition for gate GS is satisfied. Consequently, the output terminal S of the gate GS, which also constitutes the output terminal of the comparator VSZ as a whole, now issues an output signal indicating the identification of the form element "dash." This output signal is available for further data processing in any suitable manner. If desired, for example, a memory circuit may be connected to the terminal S to be activated by the "dash"-indicative signal.

Different characters are often distinct from each other not so much by the totality of form elements contained therein but by the sequence in which given form elements appear. Hence it is sometimes of interest to know whether an identified form element "dash" has been recognized as the first form element in a character being identified or after the occurrence of other form elements previously recognized in the same character.

Such a discriminating identification can be obtained with the aid of the supplementary devices added to the comparator VSZ in the embodiment of FIG. 2. As shown, one input of another AND gate UG*fs* is connected to the output *g* of the ring shift register R*s*. The second input of the gate is connected to a line *f* in which in known manner, not essential to the present invention proper, a "1" signal occurs after identification of any other form element. This "1" signal may continuously persist on line *f*. If desired, however, the line *f* may also be supplied repeatedly with "1"-signal elements at respective moments that correspond to the position of the particular form element within a scanning column, the signal "1" being applied to the line *f* whenever such other form elements are being stored in substantially the same manner as described above for the form element "dash." Now, when at the output *g* of register R*s* there occur signal elements of a sequence stored in that register, and if simultaneously the line *f* also supplies a "1" signal element because any other, previously identified form element has been recognized in the same character, then the coincidence condition for the AND gate UG*fs* is satisfied, and a bistable flip-flop stage S*fs* is activated. The activation of the flip-flop S*fs* thus indicates that prior to the occurrence of the form element "dash" at least one other form element has already been identified. At this moment it is still uncertain whether subsequent to such other form element a form element "dash" will in fact be recognized. If thereafter the comparator VSZ ascertains the presence of a form element "dash," then the signal "1" issuing at the output terminal S can be combined or correlated with the signal "1" occurring at the storer output of the bistable flip-flop S*fs*. In the embodiment of FIG. 2 such combination is effected by an AND gate GS*r*. Consequently if a signal appears at the output terminal S*r* of the latter gate, such signal indicates that a form element "dash" during scanning of a character has been identified at the right of at least one other form element in the same character.

Conversely, the combination of the signal "1" appearing at the output terminal S of the comparator VSZ with the signal issued by the bistable flip-flop S*fs* in its condition of rest, will indicate that a form element "dash" in a character being scanned has been recognized at the left of any further form elements that may be contained in the same character. In the embodiment of FIG. 2, a combination of the latter type is effected by another AND gate GS*l*, whose output terminal S*l* will provide the just-mentioned discriminating signal. The output terminals S*r* and S*l* may also be connected to memory circuits if desired. The bistable flip-flop stage S*fs* is reset to the inactive condition after transfer of the information issuing from the gate GS*r* or GS*l*, as will be further explained below.

As explained above, the comparator VSZ in the embodiment shown in FIG. 2, recognizes the presence of a straight-line portion as a form element "dash" by virtue of the fact that the sequence of signal elements "1" stored in the ring shift register R*s* is completely coincident with the projection of the scanned character in positional respect. In lieu thereof, a straight-line portion constituting a form element "dash" can also be ascertained from the condition that the projection of such a line portion and the projection of the entire scanned character positionally coincide at least within predetermined limits. This amounts to a moderating modification of the coincidence conditions to be met for the AND gates GA and GS so that these will issue respective output signals when an input signal supplied from one differentiating member is followed by an input signal from the other differentiating member within a limited interval of time. In a corresponding manner, the limits determined by the connection of the bistable flip-flop stage S*p*10 to the counter Z*p*10, with respect to the number of signal elements "1" to be stored, may be permitted to differ somewhat more from the limits predetermined with respect to the height of the projection of the character to be identified. Such a moderation of the coincidence conditions is preferably applied in cases where a character, such as the letter "H," contains several form elements "dash" which are to be defined separately from each other, as will be explained further below.

It has been mentioned above that the scanner circuitry for issuing the end-of-character signal to the line *ze* is known as such, such circuitry being contained in some character reading equipment for the purpose of ascertaining the rear boundary of the characters to be automatically identified. There are known circuits for ascertaining the rear boundary of characters that contain a circuit portion which counts any directly sequential signal element pairs "10," each consisting of a projection signal element "1" and a scanner signal element "0." This circuit portion possesses a counting device and a bistable flip-flop stage. The control (set) input of the flip-flop is connected to the count stage of the counting device that corresponds to the predetermined minimum number of the projection signal elements "1" contained in the projection of a character to be identified. The reset input of the flip-flop is connected to the count step of the counting device that corresponds to the predetermined maximum number for such projection signal elements.

Now, the just-mentioned portion of the known circuitry for ascertaining the rear boundary of the characters is similar to, and can be made identical with, the device denoted by AZ in FIG. 2, comprising the counting device Z*p*10 with the negator NG*pr* and, if desired, also the flip-flop S*p*10 with the OR gate OG*pr*. That is, exactly the same circuitry as shown at AZ in FIG. 2 can count directly sequential signal element pairs "10," each composed of a projection signal element "1" and a scanner signal element "0." Consequently the counting device of the known scanner circuitry for determining the rear boundary of the characters can be utilized in a circuit system according to the invention by additionally connecting this circuit portion into the scanner signal bus line *n* for counting the immediately sequential scanner signal elements "1" within a single scan, without incurring any disturbing mutual influence of the different counting operations.

As mentioned, a character to be identified may contain several separate form elements "dash," and these separate form elements can be separately identified. This is done by storing all of those sequences of scanner signal elements "1" that occur in directly adjacent scans, and then comparing each stored sequence with the character projection, separately from the storing and comparison of the sequences occurring in other scan columns of the same character. Preferably provided for such separate storing and comparing purposes are a plurality of ring shift registers R*s* and appertaining comparators VSZ, as will be explained with reference to the modified embodiment exemplified by FIG. 3.

Figure 3:
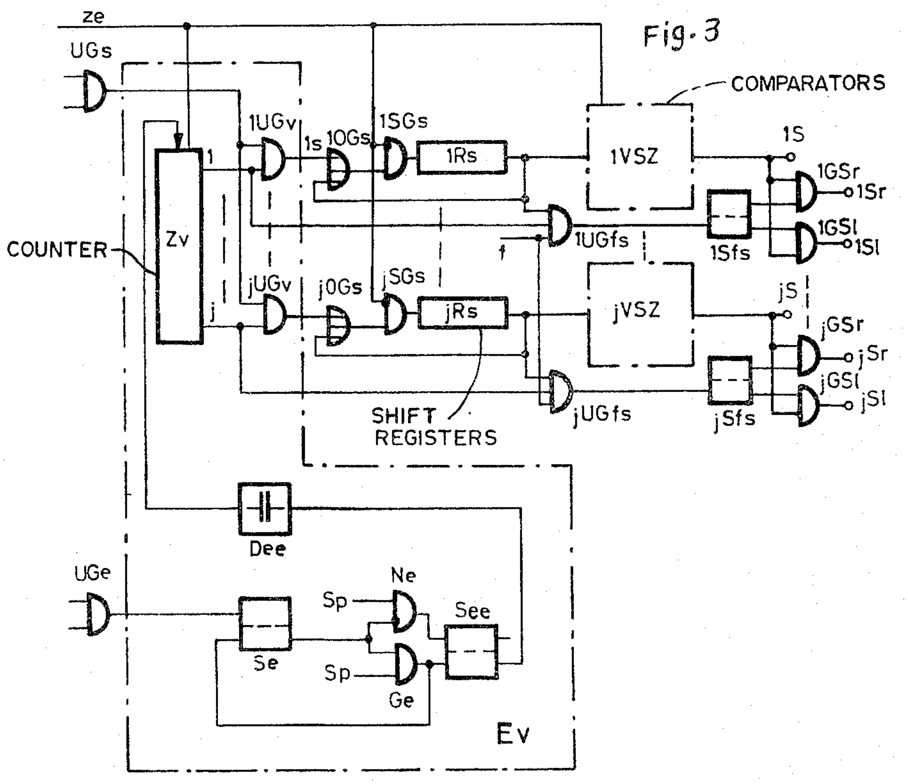
FIG. 3 shows a modified schematic circuit diagram of such a system.

FIG. 3 shows only the modified portion of the circuit system which otherwise corresponds to FIG. 2. A distributor network E*v* is interposed between the AND gate UG*s* and the inputs of a number of ring shift registers 1R*s* . . . *j*R*s*, only two of these registers being shown, although any desired number may be provided. The particular distributor network exemplified in FIG. 3 comprises a number of AND gates 1UG*v* . . . *j*UG*v* between gate UG*s* and respective registers 1R*s* . . . *j*R*s*. The respective control inputs of gates 1UG*v* . . . *j*UG*v* are connected to the respective count steps 1 . . . *j* of a counter Z*v*. The counter Z*v* is shift controlled from an AND gate UG*e* connected to the output of the counting register Z*p*10 (FIG. 2) through a first bistable flip-flop stage S*e*, an inhibit gate N*e*, a second bistable flip-flop stage S*ee*, and a differentiating member D*ee*. The gate N*e* is open only at the end of a scanning column when the first flip-flop S*e* is not activated. The differentiating member D*ee* is connected between the output of the second flip-flop S*ee* and the shift control input of the counter Z*v*. An AND gate G*e* has one input connected to the output of the first bistable flip-flop S*e* and is open only when the flip-flop S*e* is activated at the end of a scanning column. The gate G*e* has its output connected to the respective reset inputs of flip-flops S*e* and S*ee*. Gate 1OG*s* is an OR gate which receives as inputs, the output of AND gate 1UG*v* and shift register 1R*s* and its output is applied as an input to inhibit gate 1SG*s*. Gate *j*OG*s* is an OR gate which receives as inputs, the output of shift register *j*R*s* and its output is applied as an input to inhibit gate *j*SG*s*. The output of inhibit gate 1SG*s* is applied as an input to shift register 1R*s* and the output of inhibit gate *j*R*s* is applied as an input to shift register *j*R*s*.

The circuit shown in FIG. 3 operates as follows.

First the output 1 of the counter Z*v* is activated, so that any sequence of scanner signal elements "1" directly following each other during a scan in a number within the predetermined limits, is position-correctly written into the first ring shift register 1R*s*. Previously, the recognition of a storable sequence of scanner signal elements "1" had the effect of causing the first flip-flop S*e* to be activated from the AND gate UG*e* and to be thereafter reset through the AND gate G*e* at the end of the scanning column. If in the next following scan a storable sequence of scanner signal elements "1" is again recognized, the described operations are repeated. This sequence of scanner signal elements "1" is superimposed in the ring shift register 1R*s* upon the sequence of scanner signal elements "1" already stored therein. These operations take place in the same manner as described above with reference to register R*s* in FIG. 2.

Similarly, any sequences of scanner signal elements "1" as may be recognized in further, directly consecutive scans, are stored in the ring shift register 1R*s* together with the already stored sequences. If thereafter, in a subsequent scanning column, no sequence of scanner signal elements "1" is recognized as comprising a number of elements within the prescribed limits, the flip-flop S*e* does not receive a control pulse from gate UG*e* and thus remains at rest during the interval of this scan.

Consequently the next end-of-scan (synchronizing) signal arriving on line S*p* (which is connected with the line S*p* according to FIG. 2) activates the second bistable flip-flop S*ee* through the inhibit gate N*e* whose lock-out input is connected to the output of the first flip-flop S*e*. The differentiating member D*ee* now transmits a shift pulse to the counter Z*v*. This has the result that, from now on, not the AND gate 1UG*v* but the next following AND gate of the distributor network E*v* becomes conductive and transfers into the next ring shift register any storable sequences of scanner signal elements "1" as may have arrived through gate UG*s*. Thereupon the above-described operations are repeated analogously for each following step of the counter Z*v*.

The distributor network $E_v$ thus separates the AND gate $UG_s$ from the previously active ring shift register and connects it with the next ring shift register whenever, within a scanning column, a storable sequence of scanner signal elements "1" has occurred and during a next following scan such a sequence of numerically proper signal elements "1" no longer exists.

After the scanning of a character is completed, the counter $Z_v$ in distributor network $E_v$ is reset to start position, for example under control by the end-of-character signal from line *ze* or by means of a reset pulse derived therefrom.

By the means and in the manner described above, the respective sequences of scanner signal elements "1" stemming from the scanning of several straight-line portions that may individually contain a form element "dash," are stored separately from each other and, after the character is completely scanned, are compared with its projection. Thus any plurality of form elements "dash" that may be contained in one and the same character are separately identified and indicated. The identification of these individual form elements can be effected in the manner described above with reference to FIG. 2 with the aid of respective comparators such as those diagrammatically indicated in FIG. 3 at 1VSZ and *j*VSZ. If, as indicated in FIG. 3, each of the ring shift registers $1R_s$ . . . $jR_s$ has its output connected to its own comparator 1VSZ . . . *j*VSZ, then the comparison with the character projection can take place simultaneously for all of these registers. If desired, however, a single comparator can be used for this purpose and the sequences of scanner signal elements "1" stored in the individual ring shift registers $R_s$ are then successively compared with the projection of the character.

If a character to be defined contains a plurality of form elements "dash," each of these individual form elements can be further identified as to whether it appears at the left of some other form element or at the right of at least one other form element. For this purpose, each comparator, such as the comparator 1VSZ shown in FIG. 3, has its output connected to a discriminator circuit corresponding to the one described above with reference to FIG. 2.

Thus, an AND gate $1UG_{fs}$ has one input connected to the output of the ring shift register $1R_s$ and has its other input connected to the line *f* which supplies a "1" signal upon recognizing a different form element. The output of the gate is connected to the control (set) input of a flip-flop stage $1S_{fs}$. Each of the AND gates $1UG_{fs}$ . . . $jUG_{fs}$ has a third input connected to the corresponding count step of counter $Z_v$ in distributor network $E_v$. As a result, the respective gates $1UG_{fs}$ . . . $jUG_{fs}$ are opened only during that interval of time in which the AND gate $UG_s$ is connected with the appertaining ring shift register $1R_s$ . . . $jR_s$ through the just-conducting AND gate $1UG_v$ . . . $jUG_v$ of the distributor network $E_v$. Consequently the respective gates $1UG_{fs}$ . . . $jUG_{fs}$ can issue an output signal for storage in the next following flip-flop only if, during shifting of a sequence of signal elements "1" in the appertaining ring shift register $1R_s$ . . . $jR_s$, some other form element has already been recognized.

As mentioned, any such output signal from the AND gates $1UG_{fs}$ . . . $jUG_{fs}$ is stored in the flip-flop $1S_{fs}$ . . . $jS_{fs}$; and when thereafter a form element "dash" is recognized, the stored signal is compared by the appertaining comparator 1VSZ . . . *j*VSZ with the signal appearing at the output terminal 1S . . . *j*S of the comparator. Under such conditions, for example, a "1" signal occurring at the output terminal $1S_l$ of gate $1GS_l$ indicates that the form element "dash" recognized in the character just scanned is located at the left of some different form elements. Conversely, the signal "1" appearing at the output terminal $jS_r$ of gate $jGS_r$ indicates that the *j*th form element "dash" recognized in the character just scanned is located at the right of at least one different form element.

The output indicative of form elements "dash" in a scanned character can be temporarily stored in memory devices connected to the above-mentioned output terminals, and any different form elements determined by other means in the scanned character can be stored in the same manner. The stored form elements can then be composed to a word descriptive of the particular character, which word need only contain the distinctively significant form elements, if desired. The word thus formed can be compared with memorized words of given meanings for the purpose of identifying full significant meaning of the scanned character. Such further operations known as such and generally performed in identifying systems are not essential to the present invention and do not form part of the form-element circuits according to the invention.

Similarly, one or more auxiliary circuit systems may be inserted between the scanner and the identifying system according to the invention, such as for the purpose of correcting any error signals. In FIG. 2, therefore, an error correction unit is schematically indicated at EC. Such a unit, not appertaining to the present invention, may be in accordance, for example, with the one described in the copending application Serial No. 358,498, filed April 9, 1964.

As mentioned above, the components of the system shown in FIGS. 2 and 3 and described above, including the gate circuits, bistable flip-flop circuits, register and counting devices, are applicable in the form of known and commercially available components, such as those illustrated and described in the literature already mentioned. We prefer using transistor and other semiconductor devices and component circuitry as known from the following German publications: "Entwicklungsberichte der Siemens and Halske A.G.," volume 22, series 2, August 1959, pages 159–171; and "Nachrichtentechnische Fachberichte," volume 14, 1959, pages 25–29.

As mentioned, all of these individual circuit components are known as such; and it will be understood that each of them can be substituted by equivalent components of different circuitry or employing different types of semiconductor devices, or electronic tubes.

To those skilled in the art, it will be obvious upon a study of this disclosure that our invention permits of a great variety of modifications and can be given embodiments other than particularly illustrated and described herein, without departing from the essential features of our invention and within the scope of the claims annexed hereto.

We claim:

1. A system for identifying a straight-line portion as a form element of a character to be identified from "1" and "0" (black-white) sensing-signal elements produced by columnar scanning, which comprises a scanner signal input line, first storer means connected to said line for identifying those sequences of scanner signal elements "1" whose number of directly successive elements in a scan column is at least equal to a given minimum and for storing said sequences in accordance with their position in the column and conjointly with any such sequences identified in preceding columns; second storer means for storing positionally the projection of the scanned character when the scanning proceeds just beyond the rear boundary of the character; a comparator for comparing said stored sequences with said stored projection, and indicator means for indicating the presence of said straight-line form element from the occurrence of positional coincidence of said compared sequences and said projection within predetermined limits.

2. A system according to claim 1, comprising limit means in connection with said first storer means for causing said sequences of directly following signal elements "1" to be stored only if the number of directly successive elements in the sequence is below a predetermined maximum.

3. A system according to claim 1, comprising coincidence gate means connected with said comparator and said indicator means to cause indication of occurrence of said straight-line form elements when said compared sequences and projection are in full positional coincidence.

4. In a system according to claim 1, said first storer means comprising respective component storing means for separately storing those of said sequences that occur in respective mutually adjacent scan columns, and said comparator comprising means for separately comparing said respective scan sequences with said projection.

5. A system for identifying a straight-line portion as a form element of a character to be identified from "1" and "0" sensing-signal elements supplied from a columnal scanner, comprising a scanner signal input line, signal sequence identifying means connected to said line for identifying the sequences of scanner signal elements "1" which directly follow each other during a scan column in a number at least equal to a given minimum, register means connected to said signal input line under control by said sequence identifying means for storing said sequences in accordance with their position in the column conjointly with any such sequences identified in preceding columns and also storing positionally the projection of the scanned character when the scanning just proceeds beyond the rear boundary of the character; comparator means connected to said register means for comparing said stored sequences with said stored projection; and coincidence gate means connected to said comparator means for issuing an output signal indicative of the presence of said straight-line form element in dependence upon coincidence, within given limits, of said projection with said compared sequences.

6. A system for identifying a straight-line portion as a form element of a character to be identified from "1" and "0" sensing-signal elements supplied from a columnal scanner, comprising a scanner signal input line, signal sequence identifying means connected to said line for identifying the sequences of scanner signal elements "1" which directly follow each other during a scan column in a number at least equal to a given minimum; a ring shift register having a storage capacity sufficient for storing all of the signal elements receivable from an individual scan column, said ring shift register having an input connected to said signal input line under control by said sequence identifying means to successively receive the signal elements of said identified sequences, a comparator having two inputs of which one is connected to the output of said ring shift register; an end-of-character signal line connected to said other input of said comparator for supplying thereto a "1" signal during the interval of time in which the scanning proceeds one column behind the character along its projection; and coincidence gate means connected to said comparator for issuing an output signal indicative of occurrence of said straight-line form element in the event of at least approximate coincidence of the two comparator input signals.

7. A character form-element identifying system according to claim 6, comprising a shift register interposed between said signal input line and said ring shift register and having a delay length corresponding to the duration of a scan, and a main AND gate interposed between said shift register and said ring shift register, said AND gate having two inputs connected to the respective outputs of said shift register and of said sequence identifying means, whereby said AND gate is opened under control by said sequence identifying means when the sequence has the proper number of directly successive signal elements.

8. In a character form-element identifying system according to claim 7, said sequence identifying means comprising a counting device having a counting input and a reset input, said counting input being connected with said signal input line, a negator connecting said reset input to said signal input line; said counting device having a count step corresponding to said predetermined minimum of signal elements per sequence; and a bistable flip-flop stage having a control input connected to said count step and having an output connected to said main AND gate for effecting said gate control by said sequence identifying means when said minimum count step is activated.

9. In a character form-element identifying system according to claim 8, said counting device having another count stage corresponding to a predetermined maximum number of signal elements per sequence, said flip-flop stage having a reset input connected to said other count stage and to the output side of said negator.

10. In a character form-element identifying system according to claim 8, said counting device forming part of means for recognizing the rear boundary of the characters by counting signal element pairs "10" composed of a projection signal element "1" directly followed by a scanner signal element "0."

11. A character form-element identifying system according to claim 8, comprising a second AND gate interposed between said main AND gate and said flip-flop stage, said second AND gate having two inputs connected to the output of said flip-flop stage and to said negator output side respectively and being open only at the end of a sequence of scanner signal elements "1."

12. A character form-element identifying system according to claim 11, comprising a signal marking stage interposed between said main and second AND gates and having counting means for counting the number of said sequences occurring within the same scan column to mark the count step reached at the moment said second AND gate is activated, the output of said marking stage forming the connection with said main AND gate for issuing thereto a signal whenever said marked count step is reached during repeated supply of scanner signal elements.

13. In a character form-element identifying system according to claim 12, said counting means of said signal marking stage comprising a forward counting register having an input connected to said signal input line, an intermediate storage register for storing the count steps of said forward register marked by activation of said second ANT gate, and a reverse counting register to receive said marked count from said intermediate register at the start of the next scan, said reverse counting register having an input connected with the output of said shift register, and the first step of said reverse counting register forming the output of said marking stage and being connected to said main AND register for controlling the latter.

14. A character form-element identifying system according to claim 13, comprising differentiating members series connected with the inputs of said respective forward and reverse counting registers.

15. In a character form-element identifying system according to claim 6, said comparator comprising respective first and second differentiating members connected to said one comparator input and thus to the output of said ring shift register, a negator interposed between said second member and said ring shift register, a third AND gate having two inputs of which one is connected to said first differentiating member, a third differentiating member connecting said other input of said third AND gate to said other comparator input to receive said end-of-character signals, a bistable flip-flop having a set input connected to said third AND gate and having a reset connected to said second differentiating member, a triple-input coincidence gate having two inputs connected to the output of said flip-flop and to said second differential member, respectively, a fourth differential member and a negator serially connected between the third input of said latter gate and said other comparator input to receive said end-of-character signals, said coincidence gate having an output for furnishing said output signal indicative of occurrence of a straight-line form element.

16. A character form-element identifying system according to claim 6, comprising an AND gate having two inputs of which one is connected to the output of said ring shift register, an auxiliary signal line connected to the other input of said latter gate for supplying a signal "1" upon identification of a form element other than said straight-line form element, and a flip-flop stage connected to the output of said latter gate and having an output lead for providing a signal when a straight-line form element follows a different form element in the character being scanned.

17. A system for identifying a straight-line portion as a form element of a character to be identified from "1" and "0" sensing-signal elements supplied from a columnal scanner, comprising a scanner signal input line, signal sequence identifying means connected to said line for identifying the sequences of scanner signal elements "1" which directly follow each other during a scan column in a number at least equal to a given minimum; a shift register connected to said signal input line and having a time delay corresponding to the duration of a scan, a main AND gate having two inputs connected to the output of said shift register and to the output of said sequence identifying means respectively; a plurality of ring shift registers having each a storage capacity sufficient for storing all of the signal elements receivable from an individual scan column; a distributor network connected to the output of said main AND gate and having respective distributor outputs connected to said ring shift registers for sequentially activating said individual ring shift registers; comparator means having two inputs of which one is connected to the output of said ring shift registers; an end-of-character signal line connected to said other input of said comparator means; and coincidence gate means connected to said comparator means for issuing an output signal indicative of occurrence of said straight-line form element in the event of at least approximate coincidence of the two comparator input signals.

18. In a character form-element identifying system according to claim 17, said distributor network comprising discriminator means responsive to change from presence to absence of a storable sequence of scanner signal elements "1," and switching means connected with said discriminator means and controlled thereby to switch the connection of said main AND gate from one to the next of said ring shift registers.

19. In a character form-element identifying system according to claim 17, said distributor network comprising a plurality of further AND gates between said main AND gate and each of said respective ring shift registers, a counter having count steps connected to respective control inputs of said further gates and having a control input lead; said sequence identifying means comprising a counting device having a counting input and a reset input, said counting input being connected with said signal input line, a negator connecting said reset input to said signal input line; said counting device having a count step corresponding to said predetermined minimum of signal elements per sequence; and a bistable flip-flop stage having a control input connected to said count step, a coincidence gate having two inputs connected to said negator and the output of said flip-flop stage respectively for issuing a control signal when said minimum count step is activated; a first bistable flip-flop and a scanner-synchronized inhibit gate and a second bistable flip-flop and a differentiating member being all serially connected between said coincidence gate and said control input lead of said counter, said inhibit gate being conductive only when said first flip-flop is not activated at the end of a scan, and a scanner synchronized AND gate having an input connected to said first flip-flop and having its output connected to the reset inputs of said respective first and second inputs for resetting them at the end of a scan.

20. A character form-element identifying system according to claim 17, comprising a plurality of triple-input AND gates each having one input connected to the output of one of said respective ring shift registers, an auxiliary signal line connected to a second input of each of said respective gates for supplying a signal "1" upon identification of a form element other than said straight-line form element, the third inputs of said gates being connected to respective distributor outputs of said distributor network, and flip-flop stages connected to the respective outputs of said latter gates for providing a signal when a straight-line form element follows a different form element in the character being scanned.

No references cited.

MAYNARD R. WILBUR, *Primary Examiner.*

DARYL W. COOK, *Examiner.*

J. E. SMITH, *Assistant Examiner.*